(12) United States Patent
Gonce

(10) Patent No.: US 8,427,814 B1
(45) Date of Patent: Apr. 23, 2013

(54) MOBILE POWER DISTRIBUTION SYSTEM

(75) Inventor: Jeffrey A. Gonce, Perryville, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 225 days.

(21) Appl. No.: 13/116,582

(22) Filed: May 26, 2011

(51) Int. Cl.
*H02H 1/00* (2006.01)
*F03D 9/00* (2006.01)

(52) U.S. Cl.
USPC ............. 361/622; 290/55; 361/600; 361/623; 361/627; 361/641; 361/644

(58) Field of Classification Search ................... 361/622
See application file for complete search history.

(56) References Cited

U.S. PATENT DOCUMENTS

| | | | |
|---|---|---|---|
| 3,158,679 A * | 11/1964 | Ware | 174/1 |
| 3,631,324 A * | 12/1971 | Jones | 361/625 |
| 5,035,630 A * | 7/1991 | Norsworthy | 439/92 |
| 5,544,003 A * | 8/1996 | Vaughan | 361/625 |
| 5,947,768 A * | 9/1999 | Thorick | 439/577 |
| 6,252,764 B1 * | 6/2001 | Benson | 361/625 |
| 6,586,697 B1 * | 7/2003 | Enns | 218/7 |
| 6,633,479 B2 * | 10/2003 | Benson | 361/625 |
| 8,299,645 B2 * | 10/2012 | Muchow et al. | 290/55 |
| 2006/0256759 A1 * | 11/2006 | Sayeedi | 370/335 |
| 2007/0047181 A1 * | 3/2007 | Herbstritt et al. | 361/600 |
| 2008/0266758 A1 * | 10/2008 | Hurt | 361/625 |
| 2010/0232093 A1 * | 9/2010 | Kaminski | 361/623 |

* cited by examiner

*Primary Examiner* — Gregory Thompson
(74) *Attorney, Agent, or Firm* — Ulysses John Biffoni

(57) ABSTRACT

A mobile power distribution system for use in field operations requiring primary and secondary power sources wherein at least one of the power sources is a generator. The system includes primary and secondary power connections, an automatic transfer switch, a transformer, and a plurality of high and low voltage outlets. The entire system is mounted on a trailer or skid platform and fits within a standard 20-foot ISO container.

5 Claims, 5 Drawing Sheets

MOBILE POWER DISTRIBUTION SYSTEM

GOVERNMENTAL INTEREST

The invention described herein may be manufactured, used and licensed by or for the U.S. Government.

TECHNICAL FIELD

This invention relates generally to a system for providing electrical power distribution for use in a field environment.

BACKGROUND

Mobile or transportable power supply and distribution systems are needed for various types of work that require electrical power for use in a field or outdoor environment. By way of example, construction and environmental remediation projects often require such a system to power tools, lights, and other devices. For many projects this need is met by either running a power line from the nearest available power source (referred to herein as "shore power") or through the use of a generator. Various generators are commercially available for this purpose and range in size from small units that can be lifted by a single person and carried to a work site to trailer or skid-mounted generators that can power a large prdject site with multiple loads or power uses running off of the electrical power so provided.

While generators provide a source of electrical power in a field environment, the limited number and type of electrical outlets on the generator and the preset configuration of a given generator are in some applications insufficient for the operation. In addition, some applications require redundancy in power supply sources for safety purposes or other reasons. That is, at least two independent sources of electrical power are needed for these types of projects or operations. This requirement could be met through a combination of a generator and shore power, or the use of two generators. An automatic transfer switch is preferably used between the two power sources to automatically transfer loads from the primary power supply to the second power supply in the event that the former shuts down for any reason. Given these operational requirements, a power distribution system is needed to link the two power sources and provide the desired arrangement of outlets, switches, and the like.

Prior art power distribution systems are available for use in conjunction with a generator to provide a plurality of electrical outlets, switches, and the automatic transfer function described above. These systems, however, are generally designed for a particular type of application and are not as versatile and mobile as needed for other applications. Accordingly, what is needed is a mobile power distribution system that can be used for automatic switching between a primary and secondary power source, where at least one of the power sources is a generator, and the entire system can be transported fully assembled within a standard 20-foot intermodal (ISO) shipping container.

SUMMARY

The present invention provides a mobile power distribution system for use in field operations requiring primary and secondary power sources wherein at least one of the power sources is a generator. The system includes primary and secondary power connections, an automatic transfer switch, a transformer, and a plurality of high and low voltage outlets. The entire system is mounted on a trailer or skid platform and fits within a standard 20-foot ISO container. The system of the present invention can be used with a variety of commercially available components suitable for field applications. One aspect of the present invention is its configuration, which provides for ease of access and safe operation. The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the drawings indicate like elements.

DETAILED DESCRIPTION

Figure 1:
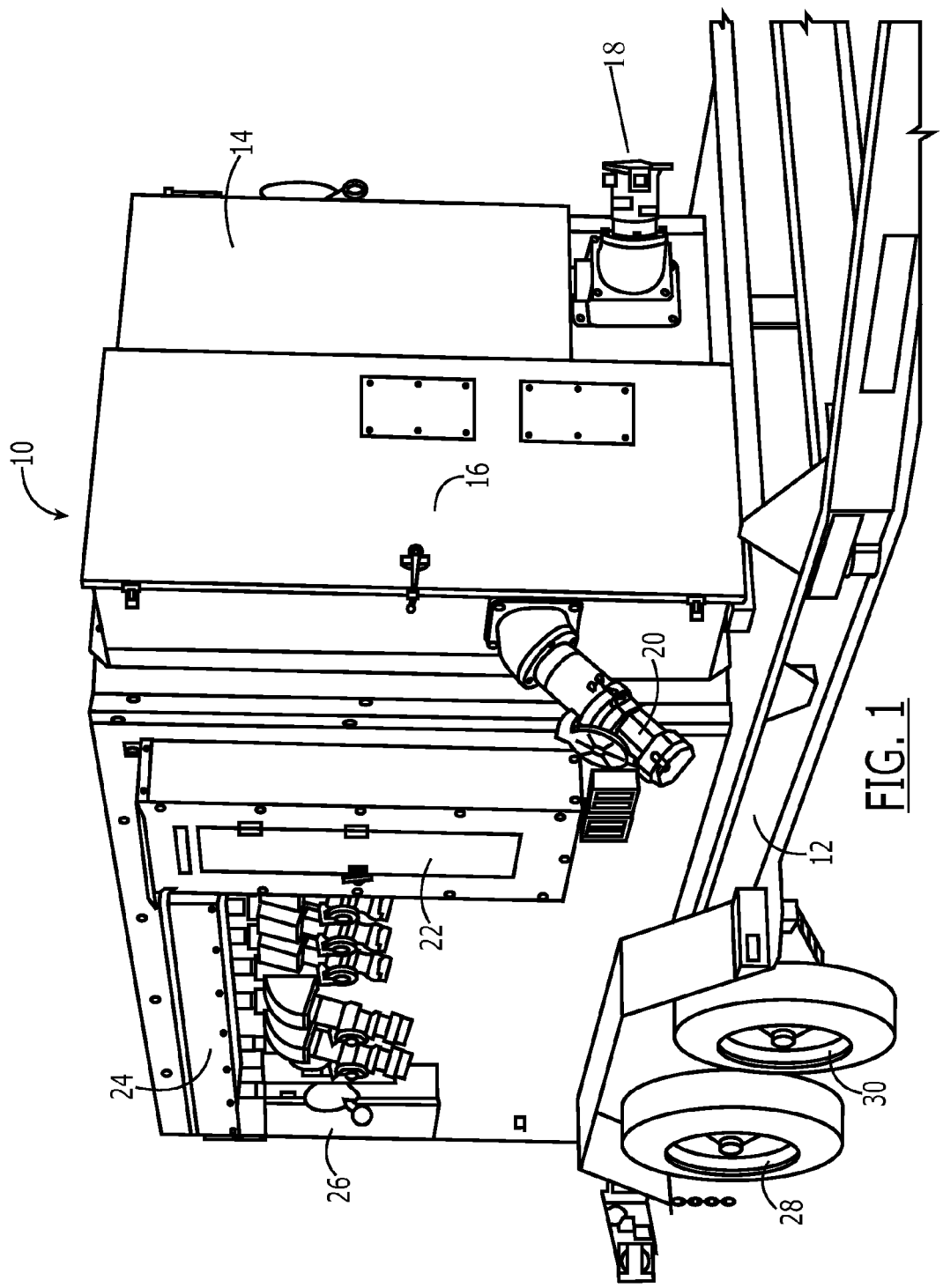
FIG. 1 is perspective view of an exemplary mobile power distribution system according to the teachings of the present invention illustrating the front and low voltage side of the system.

An exemplary mobile power distribution system 10 according to the teachings of the present invention is illustrated in the perspective view of FIG. 1. System 10 includes a platform 12, which in this exemplary embodiment is a trailer. A skid-type base could also be used as platform 12. The trailer platform 12 in this embodiment includes wheels 28, 30 and a trailer hitch (not visible). Platform 12 in this embodiment is approximately 10 feet in length and 5 feet in width, thus easily fitting within the floor space of a standard 20-foot ISO container. The height of the overall system, which includes the wheel-mounted platform 12 along with the components mounted to the top of platform 12, is approximately 6 feet in overall height. This overall height easily fits within the overhead clearance of a standard 20-foot ISO container. A skid-type base, when used as an alternative to the trailer as illustrated here for platform 12, would take even less vertical distance. Platform 12 includes decking for ease of access to the electrical components and lifting points (not shown).

Connector 18 is provided for connecting the system 10 of the present invention to a first or primary power source, which is fed into disconnect switch 14. Connector 18 is rated for the range of power sources expected to be encountered. This could include an AC or DC power source. The primary power source as connected to connector 18 could be shore power from an available electrical distribution system near the site of the field work, or this primary power source could be a generator. Disconnect switch 14 is provided in this embodiment as a means to manually disconnect this first or primary power source from the rest of the electrical components of system 10. In this way, the power supply as provided by system 10 can be manually switched from the primary power source to the generator or secondary power source as supplied through generator connector 20. This manual operation of switching from primary to secondary power source can be performed at any time by the user of system 10.

Generator connector 20 is provided for connecting system 10 to a secondary power source, which is typically a generator. Power from generator connector 20 is fed into automatic transfer switch 16. Connector 20 is rated for the range of power sources expected to be encountered from the generators used with the system.

Automatic transfer switch 16 receives electrical power from both the primary power source as connected to system 10 using connector 18 and the secondary power source as connected to system 10 using generator connector 20. In the event that power is dropped from the primary power source, automatic transfer switch 16 automatically transfers it outlet power to the secondary power source. As used herein, "dropped" means to lose power completely or partially such that the switching action of automatic transfer switch 16 is activated. As noted above, the primary and secondary power sources may both be generators. In the alternative, one of the power sources may be shore power. Other power sources and combinations are possible. For example, wind power, solar arrays, fuel cells and the like can be used with system 10 when power generation and storage capacity of such power sources are adequate for the anticipated demand load. Automatic transfer switches having proper ratings for use as switch 16 in system 10 are readily available and well known in the art to which the invention pertains.

The electrical output from automatic transfer switch 16 is fed to transformer 70 (shown in FIGS. 4 and 5), which is housed within an interior space of system 10. Transformer 70 may be a large general purpose transformer having appropriate ratings to match the anticipated power supply specifications and the desired outlet specifications. By way of example, transformer 70 may be rated for primary volts 480 delta W/FC type, providing secondary volts 208Y/120, 112.5 KVA 60 HZ 3phase.

Figure 2:
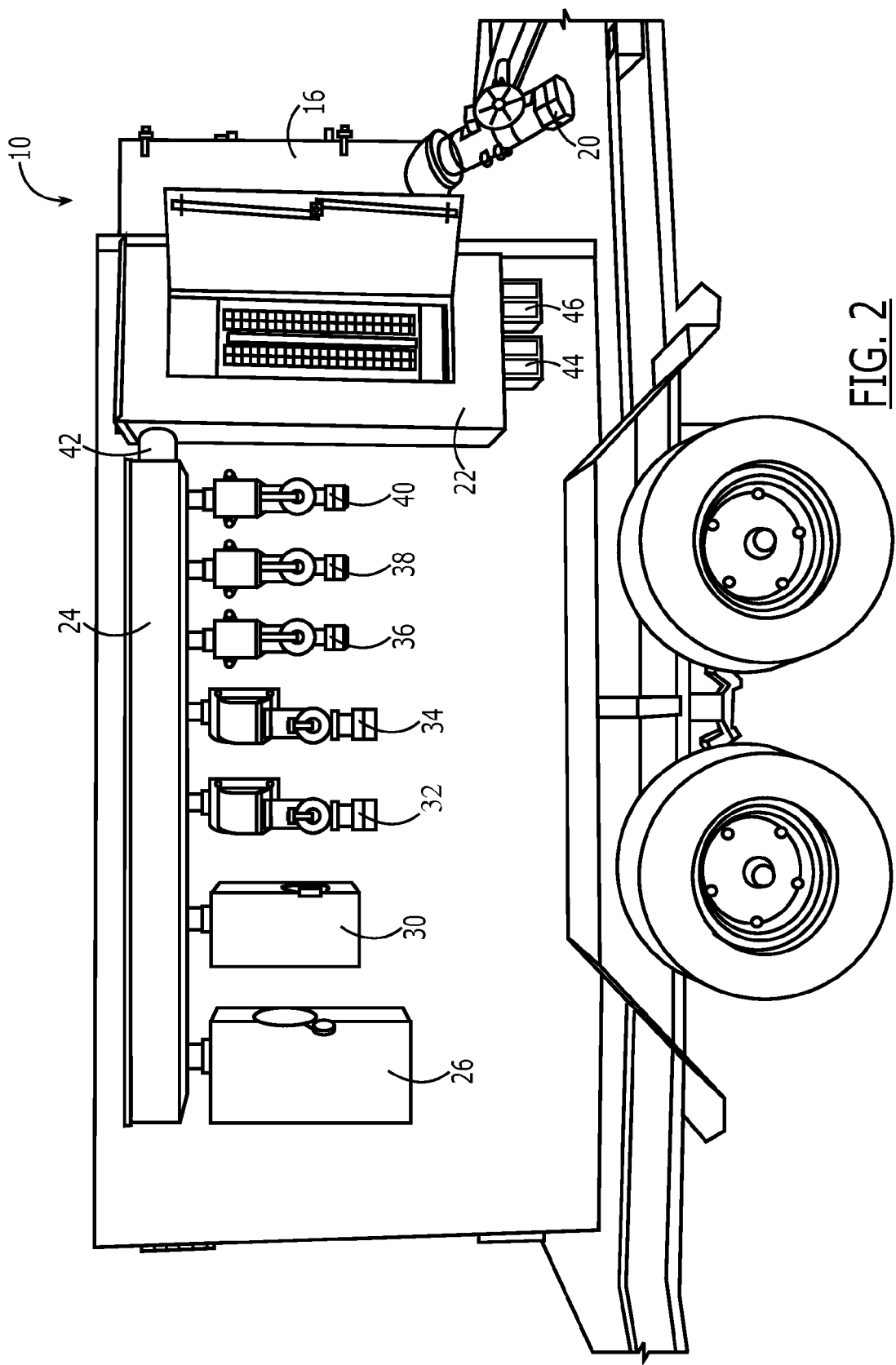
FIG. 2 is a perspective view of the exemplary system illustrating the low voltage side of the system.

Turning to FIG. 2, breaker panel 22 receives power from transformer 70 (shown in FIGS. 4 and 5) from the secondary volt output of the transformer and supplies the electrical power to a series of outlets 32, 34, 36, 38, 40 and switches 26, 30 via conduit 42 and 24. In this way, outlets connectors 32, 34, 36, 38, 40 can be used to power various equipment and other electrical loads as need on a given project. Switches 26, 30 are provided as a means for quick manual disconnect of power to outlets 32, 34, 36, 38, and 40. In this exemplary embodiment, a first manual switch 30 is provided for lower voltage connectors 36, 38, 40 and a second manual switch 26 is provided for higher voltage connectors 32, 34: Alternative embodiments may provide a switch for each connector, or some other combination of connector-to-switch ratio. Breaker panel 22 provides protection of electrical components from damage caused by an overload or a short circuit. As used herein, "normal operating mode" in reference to breaker panel 22 means that the breaker switches are closed and there are no overloads, short circuits, voltage spikes, or the like to cause the breaker switches to open. Standard electrical outlets 44, 46 are provided at the base of breaker panel 22 in the exemplary embodiment illustrated here. The configuration or spacing and arrangement of breaker panel 22, outlets 32, 34, 36, 38, 40 and switches 26, 30 as illustrated here is particularly useful in providing ease of access and safe operation.

Figure 3:
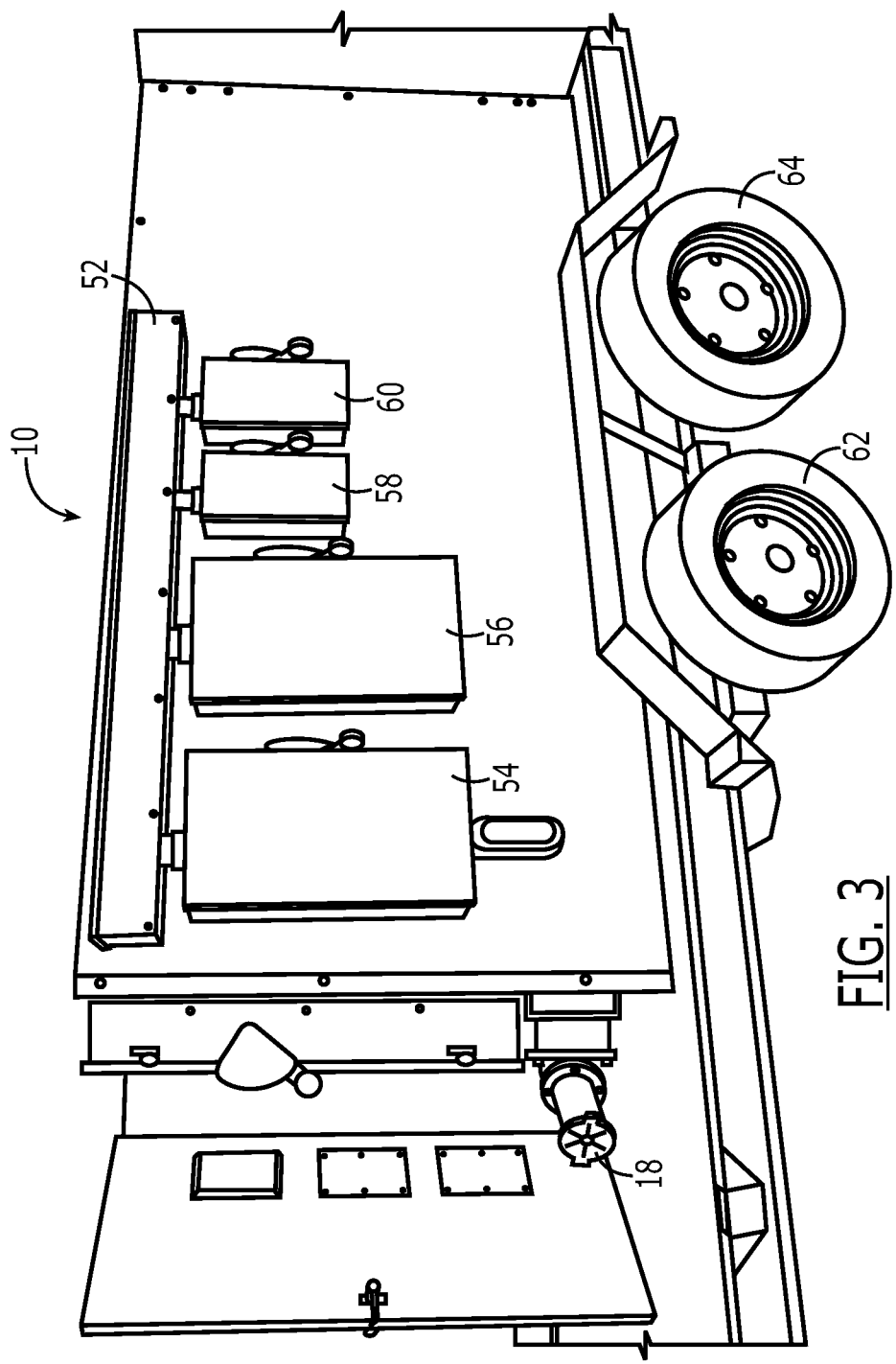
FIG. 3 is a perspective view of the exemplary system illustrating the high voltage side of the system.

Turning to FIG. 3, the high voltage side of system 10 which is opposite from the low voltage side shown in FIG. 2 is illustrated. Safety switches 54, 56, 58, 60 all receive power from automatic transfer switch 16 (shown in FIGS. 1, 2, and 5) via conduit 52. As such, safety switches 54, 56, 58, 60 are high voltage switches and are rated accordingly. In the exemplary embodiment illustrated here, these high voltage safety switches are arranged and located together on a side of system 10 which is intentionally isolated from the other switches and connectors. Separation of the high and low voltage switches, reduces the likelihood of accidental or unintentional changes in switch position.

Figure 4:
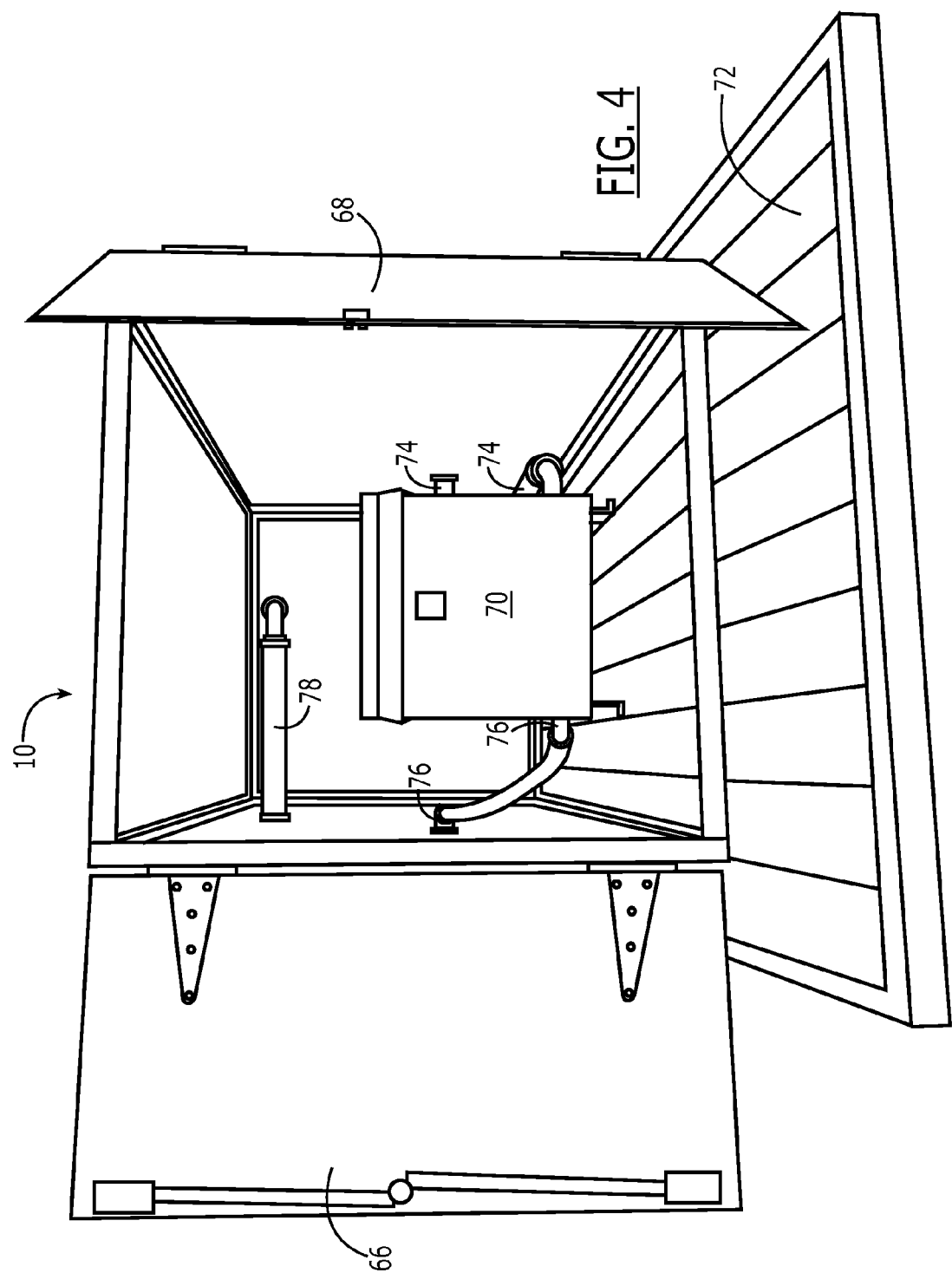
FIG. 4 is a perspective view of the exemplary system illustrating the rear of the system.

Turning to FIG. 4, the rear of system 10 is illustrated. Transformer 70 is visible within the interior space of system 10 with doors 66, 68 open. As noted above, transformer 70 may be rated for primary volts 480 delta W/FC type and provide secondary volts 208Y/120, 112.5 KVA 60 HZ 3phase. Other ratings and specifications can be utilized based on the expected power sources and desired outlet specifications. Inlet conduit 78 provides power from automatic transfer switch 16 (shown in FIGS. 1, 2, and 5) to conduit 52 on the high voltage side of system 10 (shown in FIG. 3). Inlet conduit 76 provides power from automatic transfer switch 16 to transformer 70 via conduit 52 and safety switch 54 illustrated in the external view of FIG. 3. Outlet conduit 74 connects to breaker panel 22 (shown in FIGS. 1, 2, and 5): Deck 72, which extends around the entire platform of system 10 in the exemplary embodiment, is clearly visible in this view. Deck 72 provides a level and stable work platform for the operators of system 10.

Figure 5:
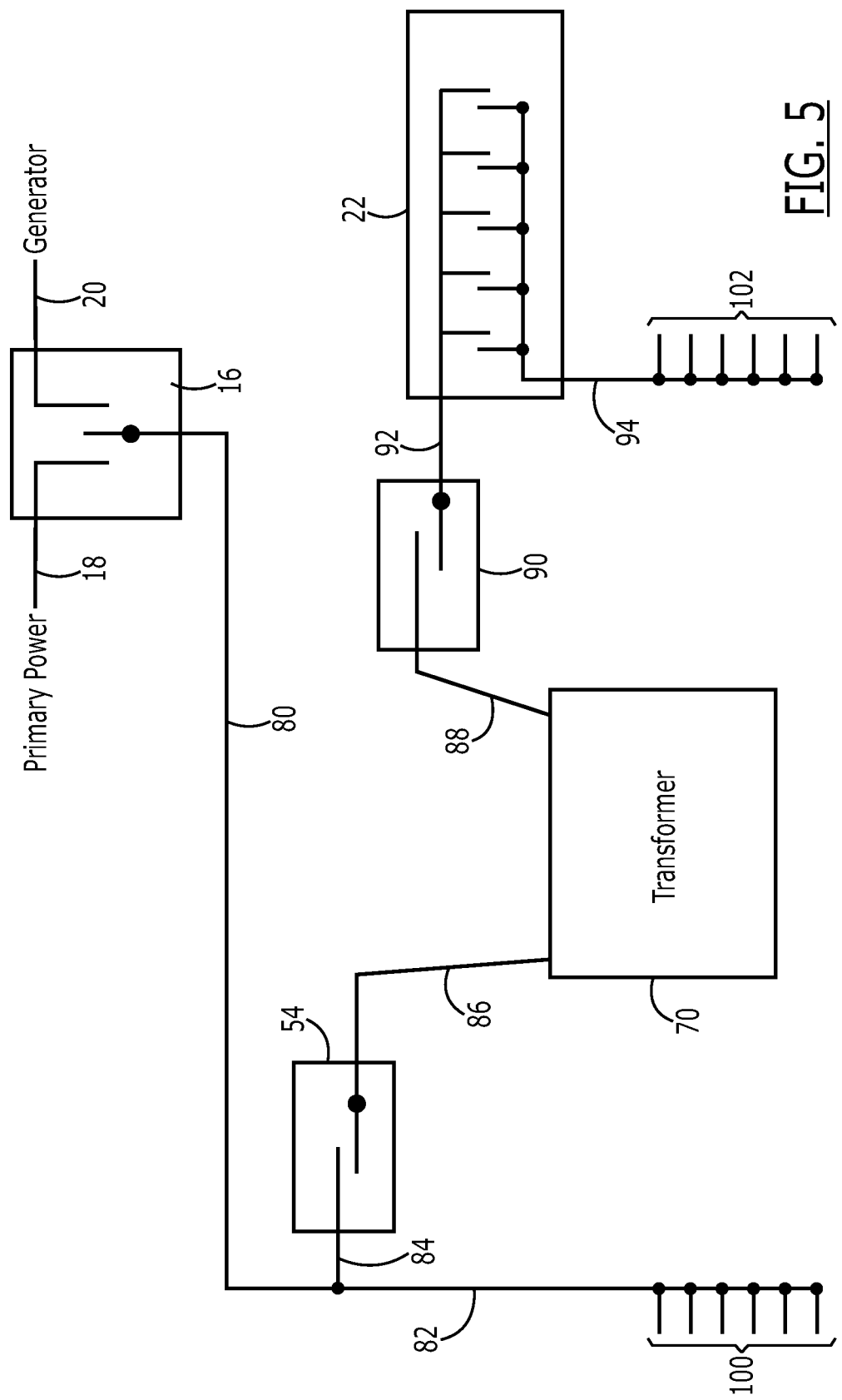
FIG. 5 is an electrical block diagram illustrating basic electrical components of the exemplary system.

Turning to FIG. 5, a simplified electrical block diagram is provided. Automatic transfer switch 16 receives power from a primary power source via connector 18 and a secondary power source via generator connector 20. Power from automatic transfer switch 16 is provided to a series of high voltage line drops 100 via conduit 80 and conduit 82. Power from automatic transfer switch 16 is also provided to transformer 70 via conduit 80, conduit 84, safety switch 54, and conduit 86. The outlet power from transformer 70 is provided to breaker panel 22 via conduit 88, safety switch 90 and conduit 92. Power is then provided from breaker panel 22 to a series of lower voltage outlets and line drops 102 via conduit 94.

While specific embodiments of the invention have been described, it will be understood that additional embodiments and various modifications may be made without departing from the spirit and scope of the invention. For example, the number and arrangement of switches and connectors can vary. The plurality of electrical outlet connectors are located within one to four feet above the deck for ease of operator access. In addition, the platform for the system may be a trailer or a skid-mounted type platform. Accordingly, these and other embodiments of the invention fall within the scope of the following claims.

What is claimed is:

1. A mobile power distribution system, comprising:
a primary power connector for connecting the system to a first power source;
a generator connector for connecting the system to a second power source;
a platform for housing the system so that the system can be transported within a container no larger than 20 feet in length, 8 feet in width, and 8 feet in height;
a transformer mounted on said platform having a transformer inlet and transformer outlet for transforming electrical power from a first voltage level as received through said transformer inlet to a second voltage level as provided through said transformer outlet;
an automatic transfer switch having a power inlet and a power outlet for providing power to said transformer, wherein said power inlet is connected in parallel to said primary power connector and to said generator connector for automatic switching of the connection of said power outlet from said first power source to said second power source in the event that the first power source is dropped;

a breaker panel having a panel power inlet connected to said transformer outlet for receiving power from said transformer at the second voltage level and having a panel power outlet for providing power at the second voltage level when said breaker panel is in normal operating mode; and a plurality of electrical outlet connectors connected to said panel power outlet for providing power at the second voltage level when said breaker panel is in the normal operating mode.

2. The mobile power distribution system as recited in claim 1, wherein said platform is a trailer having a plurality of wheels, a trailer hitch, and a deck for providing a stable work area on which an operator may stand.

3. The mobile power distribution system as recited in claim 2, wherein said plurality of electrical outlet connectors are located within one to four feet above said deck for ease of operator access.

4. The mobile power distribution system as recited in claim 1, wherein said platform is a skid mounted platform having a plurality of lifting points and a deck for providing a stable work area on which an operator may stand.

5. The mobile power distribution system as recited in claim 4, wherein said plurality of electrical outlet connectors are located within one to four feet above said deck for ease of operator access.

* * * * *